(12) United States Patent
Patel et al.

(10) Patent No.: US 8,902,832 B2
(45) Date of Patent: Dec. 2, 2014

(54) TECHNIQUES FOR SUPPORTING HARMONIZED CO-EXISTENCE OF MULTIPLE CO-LOCATED BODY AREA NETWORKS

(75) Inventors: Maulin D. Patel, Tuckahoe, NY (US); Richard Chen, Croton-on-Hudson, NY (US)

(73) Assignee: Koninklijke Philips N.V., Eindhoven (NL)

( * ) Notice: Subject to any disclaimer, the term of this patent is extended or adjusted under 35 U.S.C. 154(b) by 647 days.

(21) Appl. No.: 13/058,006

(22) PCT Filed: Aug. 7, 2009

(86) PCT No.: PCT/IB2009/053498
§ 371 (c)(1),
(2), (4) Date: Apr. 6, 2011

(87) PCT Pub. No.: WO2010/018522
PCT Pub. Date: Feb. 18, 2010

(65) Prior Publication Data
US 2011/0268055 A1    Nov. 3, 2011

Related U.S. Application Data

(60) Provisional application No. 61/087,750, filed on Aug. 11, 2008.

(51) Int. Cl.
| | | |
|---|---|---|
| H04W 72/04 | (2009.01) | |
| H04W 56/00 | (2009.01) | |
| H04B 13/00 | (2006.01) | |
| H04W 16/14 | (2009.01) | |

(52) U.S. Cl.
CPC .......... H04W 16/14 (2013.01); H04W 56/0045 (2013.01); H04B 13/005 (2013.01); H04W 56/0015 (2013.01)
USPC .......................................... 370/329; 370/350

(58) Field of Classification Search
CPC ........... H04B 13/005; H04W 56/0045; H04W 56/0015; H04W 16/14
USPC ................... 370/235, 311, 329, 350; 455/502
See application file for complete search history.

(56) References Cited

U.S. PATENT DOCUMENTS

2006/0245440 A1* 11/2006 Mizukoshi .................... 370/400
2007/0072636 A1* 3/2007 Worfolk et al. ............... 455/502
2009/0103437 A1* 4/2009 Kim et al. ..................... 370/235

OTHER PUBLICATIONS

Datta S et al: "Ad-Hoc Extensions to the 802.15.3 MAC Protocol" World of 1/Jireless Mobile and Multimedia Networks, 2005. WOWMOM 2005. Sixth IEEE International Symposium on a Taormina-Giardini Naxos, Italy Jun. 13-16, 2005, Piscataway, NJ, USA,IEEE, Los Alamitos, CA, USA, Jun. 13, 2005, pp. 293-298, XP010811093.

*Primary Examiner* — Pao Sinkantarakorn
*Assistant Examiner* — Richard Chang
(74) *Attorney, Agent, or Firm* — Larry Liberchuk

(57) ABSTRACT

A method (400) for coordinating access to a wireless medium among multiple co-located body area networks (BANs). The method comprises detecting, by a master device of a first BAN, at least one alien BAN using beacons received from at least one co-located BAN, wherein an alien BAN is a BAN having its round start time (RST) misaligned with a RST of the first BAN (S410); recording a RST offset between the first BAN and the at least one alien BAN (S420); based on the RST offset determining which of the first BAN and the at least one alien BAN is an initiator BAN and which is a target BAN (S430); and realigning the RST of the initiator BAN with the RST of the target BAN (S460).

15 Claims, 6 Drawing Sheets

TECHNIQUES FOR SUPPORTING HARMONIZED CO-EXISTENCE OF MULTIPLE CO-LOCATED BODY AREA NETWORKS

This application claims the benefit of U.S. Provisional Application No. 61/087,750 filed on August 11.

The invention generally relates to medium access control (MAC) protocols utilized in low power wireless sensor networks, such as body area networks (BANs).

A body area network (BAN) is primarily designed for permanent monitoring and logging of vital signs. An exemplary BAN 100, shown in FIG. 1, includes multiple nodes 120 which are typically sensors that can be either wearable or implantable into the human body. The nodes 120 monitor vital body parameters and movements, and communicate with each other over a wireless medium. The nodes 120 can transmit data from a body to one or more devices 130 from where the data can be forwarded, in real-time, to a hospital, clinic or elsewhere over a local area network (LAN), a wide area network (WAN), a cellular network, and the like.

The requirements for designing BANs include energy efficiency of nodes 120, scalability, integration, interference mitigation, coexistence, high quality of service (QoS), and security. Efficient energy consumption can be achieved by optimally duty cycling a receiver node (i.e., a node receiving data) between a listen state and a sleep state. In the sleep state the transceiver of the node is turned off, thereby saving energy. A duty cycling is performed by a MAC protocol with the aim of minimizing idle listening, overhearing, collisions and controlling overhead.

Multiple BAN devices may move in and out of range of each other due to, for example, movements of persons wearing these devices. In contrast to other mobile networks where movements of individual devices are uncorrelated, all the devices belonging to a single BAN move simultaneously. Therefore, in the case of BAN, the movement of the entire network should be considered.

When multiple BANs are co-located, i.e., multiple BANs are located in the range of each other and share the same medium, the transmissions of neighboring BAN devices can overlap in time, which may result in beacons or data packets collisions. Coordinated operations of multiple co-located BANs in crowded places such as subways, hospital wards, and music concert halls are essential for a seamless service. Even if co-located devices belonging to different BANs do not communicate with each other, such devices have to coordinate access to the medium to support reservations. Thus, it is imperative to design protocols that support mobility and harmonized operation of multiple co-located BANs.

In the related art several MAC protocols are disclosed for wireless networks. For example, the IEEE 802 standards committee has developed a family of standards for wireless local and personal area networks, such as the IEEE 802.11 standard designed for wireless local area networks (WLANs) and the IEEE 802.15.4 standard designed for wireless personal area networks (WPANs). None of these protocols is a suitable candidate for wireless BANs. For instance, the IEEE 802.15.4 standard defines a MAC protocol for short range transmissions which suffers from several shortcomings.

Specifically, the IEEE 802.15.4 standard does not support mobility and co-existence, as it is designed for static and low data rate wireless sensor networks (WSNs). Multiple co-located IEEE 802.15.4 based networks operating on the same medium do not coordinate their medium access. Therefore, transmissions of beacons and data frames can collide. The IEEE 802.15.4 standard neither detects overlapping data frame transmissions nor resolves systematic collisions of beacons. In addition, the IEEE 802.15.4 supports guaranteed time slot (GTS) reservations only within a network. Thus, co-located devices operating on the same medium but belonging to different networks are not aware of the time slots reserved by devices of neighboring networks. This can also lead to collisions during GTS.

For at least the shortcomings described above, it would be therefore advantageous to provide a solution that would enable harmonized co-existence of multiple co-located BAN devices belonging to different BANs.

Certain embodiments of the invention include a method for coordinating access to a wireless medium among multiple co-located body area networks (BANs). The method comprises detecting, by a master device of a first BAN, at least one alien BAN using beacons received from at least one co-located BAN, wherein an alien BAN is a BAN in which its round start time (RST) is misaligned with a RST of the first BAN; recording a RST offset between the first BAN and the at least one alien BAN; based on the RST offset determining which of the first BAN and the at least one alien BAN is an initiator BAN and which is a target BAN; and realigning the RST of the initiator BAN with the RST of the target BAN.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

Figure 1:
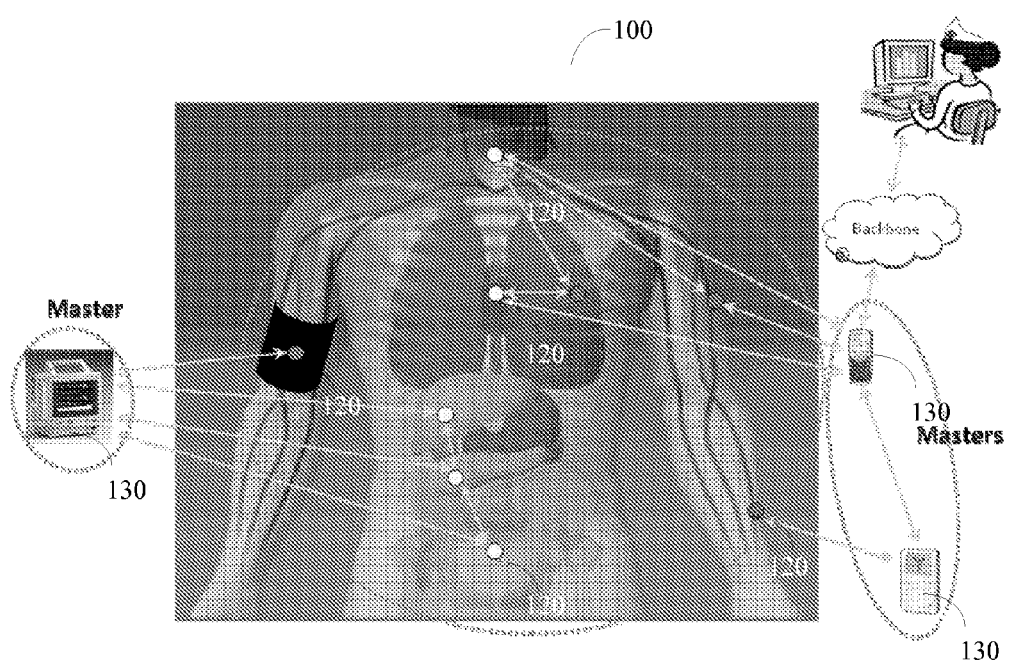
FIG. 1 is a schematic diagram of a body area network.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 2:
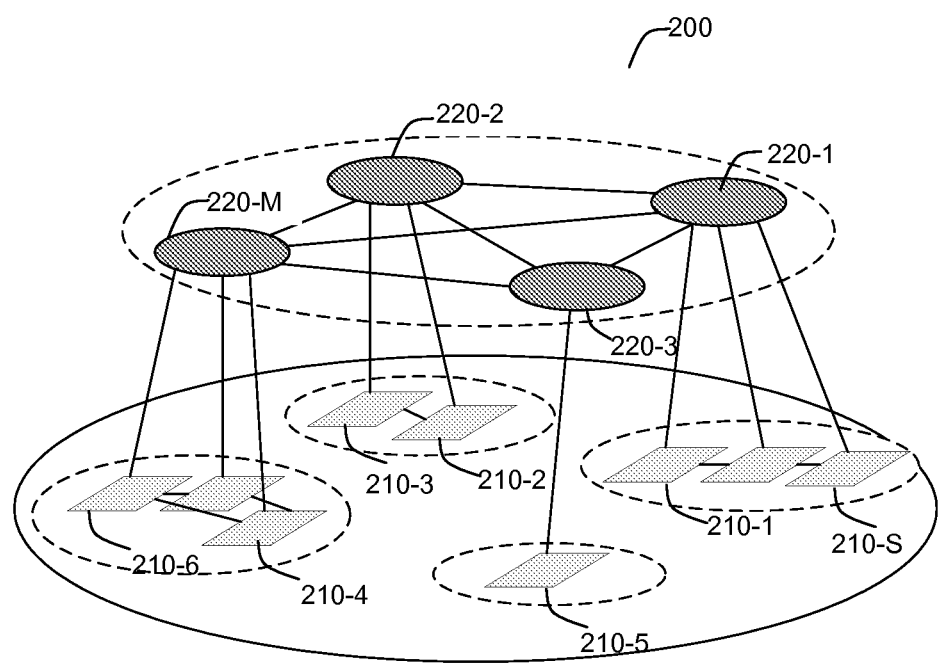
FIG. 2 illustrates a topology of a body area network utilized to describe the various embodiments of the invention.

FIG. 2 shows a topology of a body area network (BAN) 200 utilized to describe the various embodiments of the invention. The BAN 200 includes two tiers of devices: slave devices 210-1 through 210-S and master devices 220-1 through 220-M. Typically, the slave devices 210-1 to 210-S are implantable, swallowable or disposable and characterized by having low energy budgets and limited resources (e.g., processing power, memory). On the other hand, the master devices 220-1 to 220-M are wearable, can be recharged frequently and therefore have higher energy budgets and more resources than the slave devices.

A master device 220-X (where X is an integer equal to or greater than 1) manages one or more slave devices 210-Y (where Y is an integer equal to or greater than 1). To this end, the master devices 220-1 to 220-M transmit periodic beacons for synchronization, requesting medium reservation, and announcing broadcast/multicast. Based on the information exchanged by the periodic beacons, the master devices 220-1 to 220-M derive a conflict-free reservation schedule to enable QoS support. In addition, the master devices 220-1 to 220-M detect the presence of other BANs in the vicinity to support the harmonized coexistence of multiple BANs. In the topology illustrated in FIG. 2, all the master devices 220-1 to 220-M synchronize medium access and implement time slot reservation using a distributed beaconing process. In a preferred embodiment of the invention the access to the medium is divided into fixed and repeated duration time rounds, where a time round is a data structure designed to include a predefined number of superframes each of which includes a fixed number of time slots.

Figure 3:
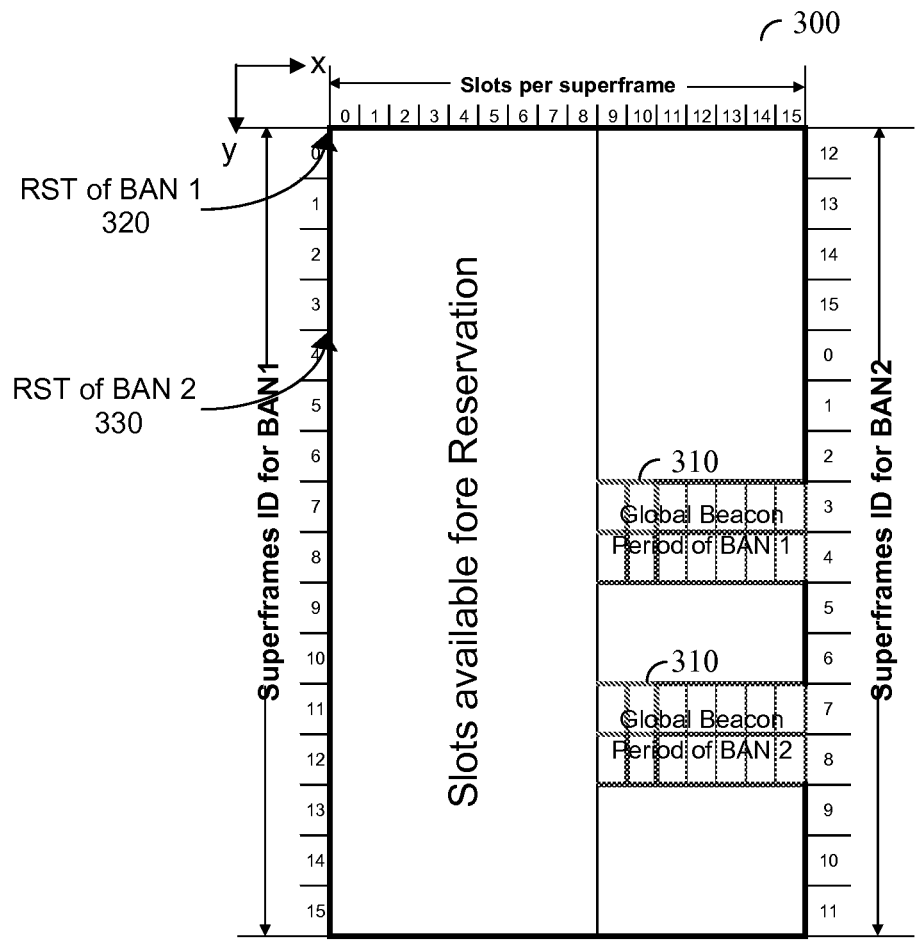
FIG. 3 is a two-dimensional representation of a time round.

FIG. 3 shows an exemplary and non-limiting two-dimensional representation of a time round 300. The X-axis represents the time slots per superframe and the Y-axis represents the superframes per time round 300 for a BAN-1. All the devices belonging to the same BAN have identical round start times (RSTs), and RSTs for different BANs are generally not aligned.

A master device can reserve time slots during which the device has an exclusive right to access the medium. A predefined number of time slots in a time round are reserved for a global beacon period (GBP) 310 being utilized for transmitting global beacons. In the time round 300, global beacon periods are allocated for two co-located BANs: BAN-1 and BAN-2. In this example, the BAN-2 moves into the range of BAN-1 (i.e., all the devices belonging to BAN-2 move simultaneously into the range of BAN-1). Consequently, the RST of BAN-2 is realigned with the RST of BAN-1.

The global beacon period 310 is required to facilitate periodic synchronization of master devices. The master devices listen to the global beacon period 310 and send global beacons in their allocated time slots to synchronize and exchange medium reservation requests. Global beacons are also used to discover neighbors and network topology, to provide QoS and to schedule broadcast/multicast data transmissions.

In accordance with an embodiment of the invention global beacons are transmitted using a scheduling method that dynamically constructs and maintains a logical tree topology of master devices in the BAN. Accordingly, a global beacon period is further divided into two time periods: an ascending period (AP) and a descending period (DP).

During the AP all master devices, but the root device, transmit their global beacons in their respective slots in ascending order, i.e., children transmit their global beacons before their parents. During the AP parents listen to their children's global beacons. During the DP the sequence of global beacon transmissions is reversed, i.e., parents transmit their global beacons before their children. In this period children listen to their parent's global beacons.

During the AP, global information is passed from children to ancestors (parents). At the end of the AP, the root device knows the complete global information which it distributes to all the master devices during the DP. Thus, the beacon scheduling method ensures that all master devices belonging to the same BAN receive the global information even though they are not in direct communication range of each other.

In accordance with certain principles of the invention when a BAN moves into the range of another BAN, a round start time (RST) of one of the BANs is realigned, such that BAN superframes are synchronized and their global beacon periods do not overlap in time. Specifically, the RSTs of two BANs are aligned if the offset between the RSTs of two BANs is equal to an integer multiple of a superframe, where the multiplier is an even number greater than or equal to 2. For example, in the time round 300, RSTs of BAN-1 and BAN-2 (labeled as 320 and 330, respectively) are offset by 4 superframes. Typically, a minimum of 2 superframes separation between RSTs of co-located BANs is required in order to avoid overlapping of global beacon periods.

Figure 4:
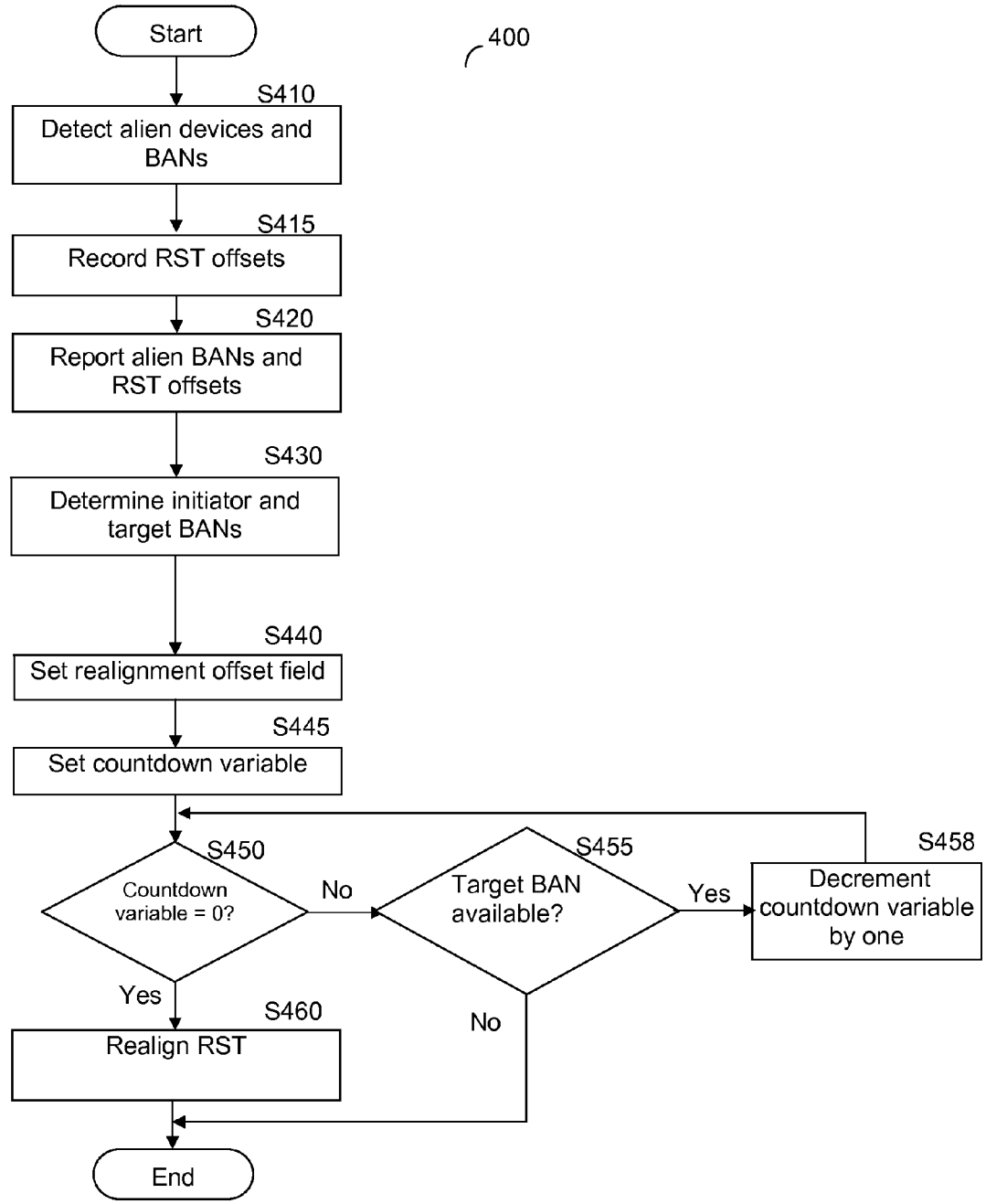
FIG. 4 is a flowchart for describing a method for realigning RSTs of co-located BANs.

FIG. 4 shows an exemplary and non-limiting flowchart 400 describing the method for realigning RSTs of co-located BANs accessing the same wireless medium implemented in accordance with an embodiment of the invention.

At S410, the presence of an alien device, and thereby an alien BAN is detected when a master device overhears a beacon sent by another master device of a different BAN, whose RST is not aligned with the overhearing master device. Any two devices with nonaligned RSTs are called alien devices with respect to each other. Master devices are responsible for detecting and reporting the presence of an alien device. Typically, a master device can detect an alien device by overhearing an alien device beacon. In accordance with one embodiment, master devices periodically scan unreserved time slots to detect alien devices.

At S415, upon hearing an alien beacon the master device records the offset between its RST and the RST of the alien device. This enables an overhearing device to deduce the offset between the RST of a BAN hosting the overhearing device and a RST of an alien BAN. It should be noted that multiple alien BANs can be discovered. Such BANs may be distinguished by differences in their RST offsets.

At S420, the master device reports, via global beacons, the existence of alien BAN(s) and their corresponding RST offset(s) to all the other master devices belonging to the same BAN. Global beacon protocol ensures dissemination of this information to all the master devices belonging to the same BAN during a global beacon period. That is, at the end of the global beacon period all master devices are made aware of the existence of alien BAN(s), if any, and their corresponding RST offsets. At S430, it is determined which BAN is to be realigned with the other BAN(s). That is, an initiator BAN and a target BAN are selected. Each BAN independently decides whether it needs to realign its RST with another BAN, and if so with which BAN in case there are multiple co-located BANs.

In one embodiment, to avoid ambiguity, the BAN that detects an alien BAN with a RST falling within the first half of one of its superframes initiates the RST realignment process. It should be noted that if there are two co-located BANs, then a master device of a BAN that meets this criterion initiates the realignment process whereas the other BAN is the target BAN. If there are multiple alien co-located BANs satisfying this criterion, then the alien BAN with the largest RST offset is selected as a target for realignment. It should be noted that only initiator BANs realign their RSTs with the target BAN. This ensures quick synchronization of co-located BANs. As noted above, RST offsets are globally known (among the master devices belonging to the same BAN). Thus there is no ambiguity in identifying the target network for realignment. It should be noted that if a target BAN for the realignment process is not found, then the process is terminated.

At S440, a master device in the initiator BAN sets a realignment offset field to a positive amount of time that all master devices in the initiator BAN will delay their RSTs to align with a RST of a target alien BAN. The new location of the RST is chosen to ensure that after realigning the new location of a global beacon period does not overlap with global beacon periods of the neighboring and co-located BANs. The realignment offset field is embedded in global beacons to inform the master devices (belonging to the initiator BAN) of the impending realignment and to provide the time synchronization information. The global beacon protocol ensures dissemination of this information to all the master devices belonging to the initiator BAN.

At S445, a realignment countdown variable is set to an initial value that represents the remaining number of time rounds (after the current round) after which the initiator BAN will realign its RST. That is, the countdown variable indicates the time when the realignment process will be triggered. The value of the countdown variable is identical for all the master devices belonging to the initiator BAN.

At S450, it is checked if the countdown variable equals to zero, and if so execution continues with S460; otherwise, at S455, another check is made to determine if the target BAN is not available. If so, execution ends, otherwise, at S458, at the end of a time round the value of the countdown variable is decremented by one, and then execution returns to S450.

At S460, when the countdown variable reaches zero, all master devices belonging to the initiator BAN realign their RSTs with a RST of the target BAN. The realignment process is performed to ensure that superframes sent by master devices of the initiator BAN are synchronized with target BAN superframes and their global beacon periods do not overlap with global beacon periods of co-located BANs. At the completion of the realignment process the master devices terminate sending global beacons in their previous global beacon periods.

Master devices may inform their slave devices about the impending realignment and the realignment offset via local beacons. Thus, slave devices are aware of the locations of their pertinent frames after the realignment is completed.

The realignment process is restarted if another BAN having a RST that falls within the first half of the superframe of the initiator BAN and which has a larger RST offset than the current target BAN is being detected before the execution of S460.

It should be noted that if multiple co-located BANs invoke the realignment process simultaneously, their selections of RST realignment offsets maybe in conflict with RSTs of their neighboring BANs. That is, after the realignment, the global beacon period of an initiator BAN may overlap with the global beacon period of another initiator BAN. If a conflict is detected, one of the co-located BANs proceeds with its RST realignment offset selection, while other BANs reset their countdown variables as well as RST realignment offsets to avoid overlapping of global beacon periods. The global beacon periods occupied by neighboring BANs are marked unavailable. In order to minimize potential conflicts, the RST realignment offsets and the status of the realignment process executed by initiator BANs are announced in their global beacons which enable neighboring BANs to learn about impending realignments and avoid conflicts.

Figure 5A:
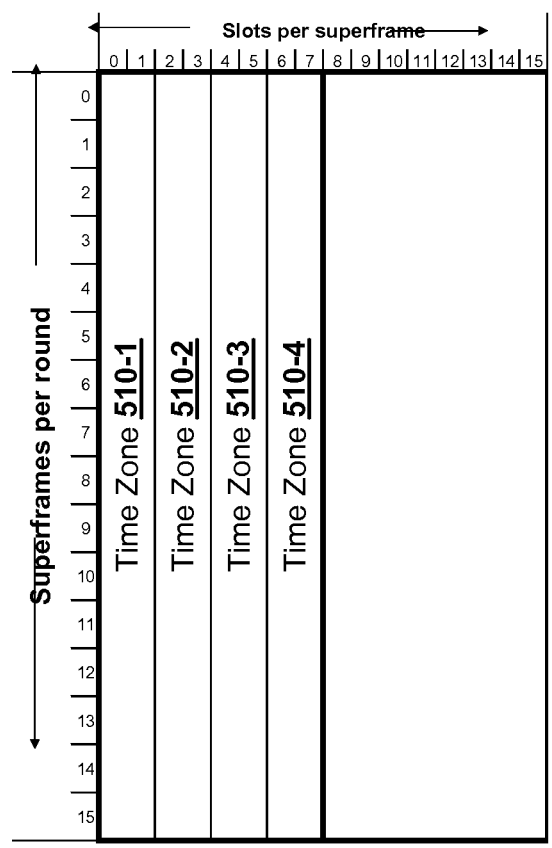
FIGS. 5A and 5B are diagrams for illustrating a two-dimensional representation of a time round.

Upon completion of the realignment process, superframes of co-located BANs are synchronized and reservation of time slots can be facilitated. In accordance with an embodiment of the invention, in order to enable time slots reservation across co-located BANs, time slots available for reservation are divided into time zones. As illustrated in FIG. 5A, a time round includes 4 time zones 510-1 through 510-4, each of which includes 2 time slots per superframe.

Figure 5B:
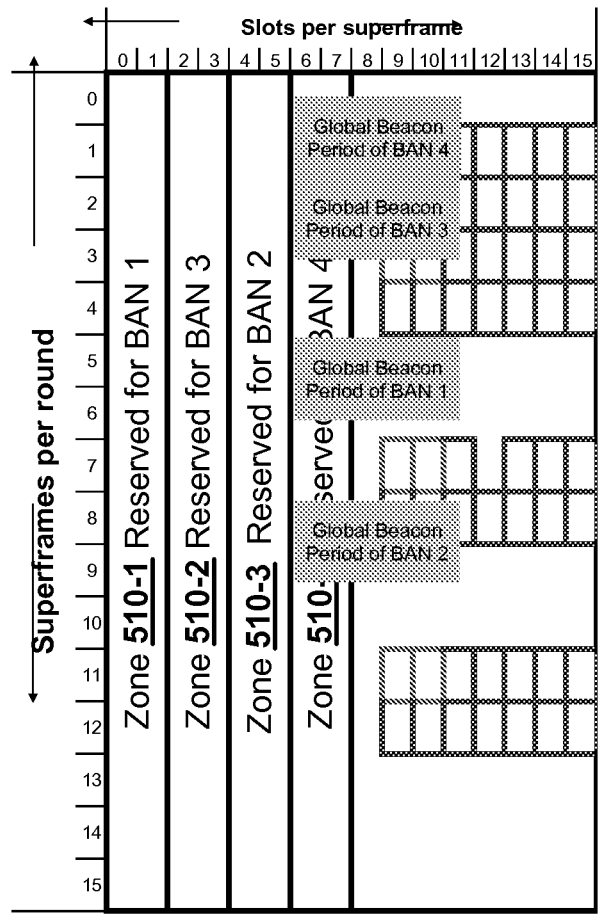

Each BAN can own zero or more time zones, during which the BAN has exclusive right to access the medium. FIG. 5B shows an example of four (4) co-located BANs where each BAN owns one zone. That is, BAN-1 can access the medium during time zone 510-1, BAN-3 during time zone 510-2, BAN-2 during time zone 510-3, and BAN-4 during time zone 510-4.

When there is only one operating BAN it can potentially own all time zones in a time round. However, when multiple BANs are co-located, all networks have to harmonize the time zone ownership. With this aim, each BAN continues to monitor the presence of other BANs to determine the number of co-located BANs. As noted above, alien BANs are detected and distinguished based on their RSTs. The global beacon periods of aligned BANs are tracked to maintain synchronization, to monitor their presence and to determine their zone ownership. Master devices can share the responsibility of monitoring a neighbor BAN global beacon periods. Time zone ownerships are also announced via global beacons.

In accordance with one embodiment of the invention, each BAN is entitled to reserve a number of time zones determined as follows:

$$\text{Time Zones entitled to } BAN[i] = \max\left\{1, \left\lfloor \frac{\text{Total Zones}}{\text{Colocated } BANs \text{ determined by } BAN[i]} \right\rfloor \right\}$$

The number of reserved time zones can be changed based on the needs of a BAN. Specifically, when a BAN determines that it owns an excess number of time zones, the BAN may relinquish the ownership of some time zones. On the other hand, if a BAN owns fewer time zones than it is entitled to, additional available time zones may be requested. The BAN devices dynamically adjust their time zones ownership according to the number of co-located BANs and the availability of time zones.

It should be noted that after the completion of the realignment, a newly aligned BAN chooses a non-overlapping time zone with respect to its neighbors. This process is repeated each time a BAN realigns with another BAN. When all time zones are already occupied, a newly aligned BAN operates during a global prioritized contention access (GPCA) period. This period refers to a group of unreserved time slots in a superframe.

It should be appreciated that the realignment process described herein can be adapted to provide spatial reuse when two or more BANs, which are not neighbors of each other, can reserve overlapping time zones.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as any combination of hardware, firmware and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The invention claimed is:

1. A method for coordinating access to a wireless medium among multiple co-located body area networks (BANs), each BAN including a plurality of slave devices and a plurality of master devices arranged in a two-tier architecture, the method comprising,
   detecting, by a master device of a first BAN, at least one alien BAN using beacons received from at least one co-located BAN, wherein an alien BAN is a BAN where a round start time (RST) is misaligned with a RST of the first BAN;
   recording a RST offset between the first BAN and the at least one alien BAN;
   based on the RST offset, determining which of the first BAN and the at least one alien BAN is an initiator BAN and which is a target BAN; and
   realigning, by all master devices belonging to the initiator BAN, the RST of the initiator BAN with the RST of the target BAN.

2. The method of claim 1, further comprising:
   setting a realignment offset field, wherein the realignment offset field indicates a positive amount of time that all master devices in the initiator BAN delay their RSTs to align with a RST of the target BAN; and
   setting a countdown variable to indicate a time when the realignment of the initiator BAN with the target BAN is triggered.

3. The method of claim 1, wherein the first BAN is determined to be the initiator BAN when a RST of the at least one alien BAN falls within the first half of a superframe of the first BAN.

4. The method of claim 1, wherein the RST is a start time of a round time, and wherein the time round includes a plurality of superframes and each superframe includes a plurality of time slots.

5. The method of claim 2, wherein the realignment offset field is included in a global beacon and transmitted to all master devices in the initiator BAN.

6. The method of claim 2, wherein the value of the countdown variable is identical for all master devices in the initiator BAN.

7. The method of claim 3, wherein an alien BAN with the largest RST offset is determined to be the target BAN, when multiple alien BANs were detected.

8. The method of claim 4, wherein one or more time slots are allocated for a global beacon period of a co-located BAN, and wherein during the global beacon period master devices of the co-located BAN transmit global beacons.

9. The method of claim 4, further comprising dividing time slots available for medium access reservation into time zones, wherein each BAN among the at least one co-located BAN owns a predetermined number of time slots.

10. The method of claim 8, wherein the realignment of the RSTs ensures at least synchronization among superframes of co-located BANs and non-overlapping among global beacon periods of co-located BANs.

11. The method of claim 9, wherein the realignment of the RSTs ensures non-overlapping between time zones owned by the initiator BAN and time zones owned by the at least one co-located BAN.

12. The method of claim 10, wherein global beacon periods of co-located BANs are separated by at least two superframes.

13. A method for coordinating access to a wireless medium among multiple co-located body area networks (BANs), the method comprising,
   detecting, by a master device of a first BAN, at least one alien BAN using beacons received from at least one co-located BAN, wherein an alien BAN is a BAN where a round start time (RST) is misaligned with a RST of the first BAN;
   recording a RST offset between the first BAN and the at least one alien BAN;
   based on the RST offset, determining which of the first BAN and the at least one alien BAN is an initiator BAN and which is a target BAN; and
   realigning the RST of the initiator BAN with the RST of the target BAN, wherein the RST is a start time of a round time, and wherein the time round includes a plurality of superframes and each superframe includes a plurality of time slots;
   the method further comprising dividing time slots available for medium access reservation into time zones, wherein each BAN among the at least one co-located BAN owns a predetermined number of time slots, wherein the number of time zone reserved for a BAN is determined as follows:

$$\text{Zones entitled to } BAN[i] = \max\left\{1, \left\lfloor \frac{\text{Total Zones}}{\text{Colocated } BANs \text{ determined by } BAN[i]} \right\rfloor\right\}.$$

14. The method of claim 13, wherein the number of reserved time zones for each BAN can be dynamically changed.

15. A non-transitory computer readable medium having stored thereon computer executable code, when executed, causing a processor to perform a process of coordinating access to a wireless medium among multiple co-located body area networks (BANs), each BAN including a plurality of slave devices and a plurality of master devices arranged in a two-tier architecture, the process comprising,
   detecting, by a master device of a first BAN, at least one alien BAN using beacons received from at least one co-located BAN, wherein an alien BAN is a BAN where a round start time (RST) is misaligned with a RST of the first BAN;
   recording a RST offset between the first BAN and the at least one alien BAN;
   based on the RST offset, determining which of the first BAN and the at least one alien BAN is an initiator BAN and which is a target BAN; and
   realigning, by all master devices belonging to the initiator BAN, the RST of the initiator BAN with the RST of the target BAN.

* * * * *